Figure 1:
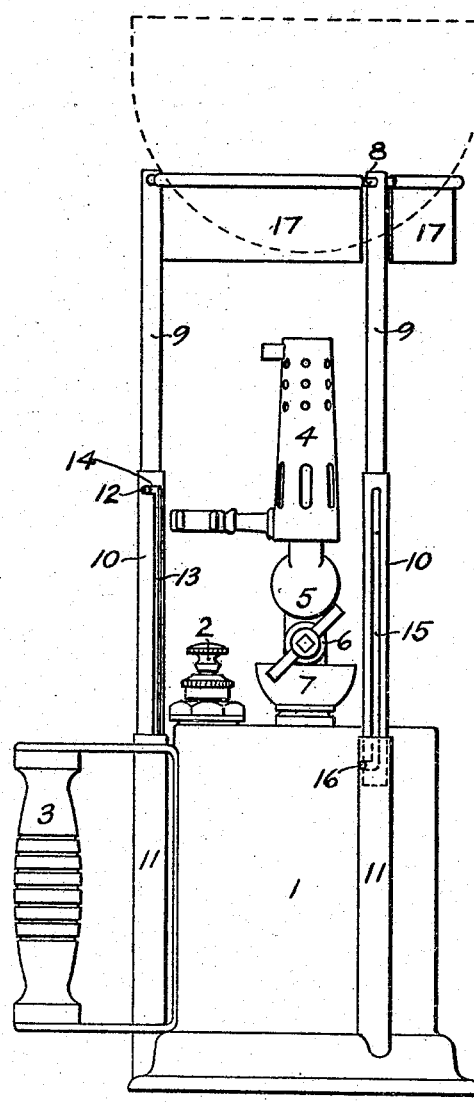

L. SCHEMNITZ.
BLAST LAMP.
APPLICATION FILED OCT. 31, 1908.

936,815.

Patented Oct. 12, 1909.
2 SHEETS—SHEET 1.

Witnesses

Inventor
Louis Schemnitz
by his Attorney

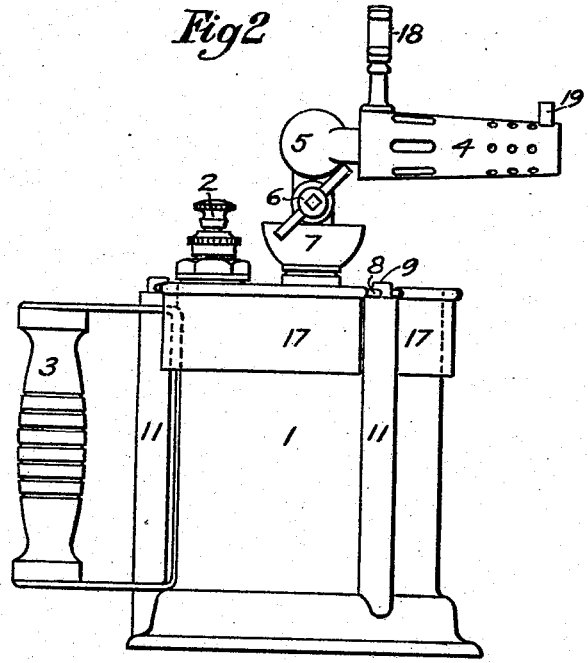
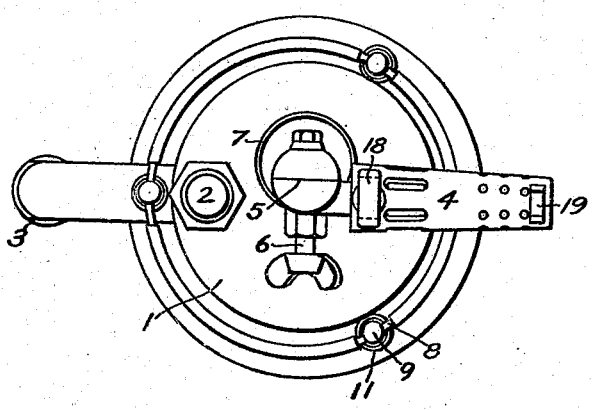
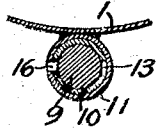

UNITED STATES PATENT OFFICE.

LOUIS SCHEMNITZ, OF NEW YORK, N. Y., ASSIGNOR TO ATLAS TORCH AND BRASS COMPANY, A CORPORATION OF NEW YORK.

BLAST-LAMP.

936,815.  Specification of Letters Patent.  Patented Oct. 12, 1909.

Application filed October 31, 1908. Serial No. 460,385.

*To all whom it may concern:*

Be it known that I, LOUIS SCHEMNITZ, a subject of the Emperor of Austria-Hungary, residing in New York city, New York, have invented an Improvement in Blast-Lamps, of which the following is a specification.

My invention relates to improvements in blast lamps.

One object of the invention is to produce a blast lamp which may conveniently be used either as a torch, for burning paint, soldering, etc., or as a stove for heating vessels containing solder or other material. For this purpose I provide the blast lamp with a burner which may be moved into either an inclined or horizontal position or an upright position, and with a support, suitable for receiving a melting pot or other vessel, which may be moved into operative position above the burner, or depressed so as to be out of the way when the lamp is used as a torch.

Another object of my invention is to produce a support for vessels to be heated, arranged and constructed to be readily depressed out of operative position when not in use. This feature of my invention, though designed particularly for use in connection with the blast lamp above described, is adapted for use in connection with various kinds of lamps and stoves.

I will now describe the embodiment of my invention, illustrated in the accompanying drawings.

In the drawings Figure 1 is a side elevation of a blast lamp embodying the present invention, with its parts arranged for use as a stove. Fig. 2 is a side elevation of the lamp shown in Fig. 1, with its parts arranged for use as a torch. Fig. 3 is a plan view of the lamp in the position of Fig. 2. Fig. 4 is a horizontal detail sectional view of one of the telescopic uprights.

The illustrated embodiment of the present invention has a hollow body 1, which serves as a reservoir for the gasolene or other fuel used in the burner. This reservoir is provided with an air pump 2, to maintain the necessary pressure on the fuel, and with a handle 3 by which it may be carried when the lamp is used as a torch. The burner 4 is of any ordinary or suitable form. It is connected with the body 1 by connections including a swivel joint 5, which permits the burner to be swung about a horizontal axis. In Fig. 1, the burner is so swung into vertical position, so as to project its flame upward. The flame is controlled by a fuel valve 6, and a cup 7 is arranged below the valve to contain the fuel used in heating the burner to start its operation.

The support for the vessel to be heated comprises a ring 8, mounted upon, and rigidly connecting three upright rods 9. The rods 9 slide longitudinally in tubes 10, which, in turn, slide in sleeves 11 fixed to the body 1. This telescopic arrangement permits the support, when not in use, to be depressed to the position of Fig. 2, so that the support while conveniently ready for use, is out of the way when the lamp is out of operation or is used as a torch.

To maintain the support in the extended position of Fig. 1, so that it may support a melting pot or other vessel securely, each rod 9 is provided with a short laterally-projecting pin 12, which engages a longitudinal slot 13 in the tube 10. This slot terminates, at its upper end, in a short lateral recess 14. Each tube 10 has also a second slot 15 opposite to the slot 13, which terminates in a lateral recess at its lower end and engages a short inwardly-projecting pin 16 at the upper end of the sleeve 11. When the telescoping members have been fully extended, so that the pins 12 and 16 reach the ends of their respective slots the tube 10 is turned slightly, and the pins are thereby engaged with the recesses at the ends of the slots. In this position the rods and tubes are locked against sliding movement, and the support is maintained rigidly in operative position.

When the burner is in the position of Fig. 2, it may be used for heating a soldering copper, and for this purpose it is provided with a hook 18 and a crotch 19 to support the shank of a soldering copper.

In order to increase the heating effect of the burner when used as in Fig. 1, I provide curved shields 17, fixed to the ring 8, by which the flame is more or less confined to the bottom of the vessel to be heated. When the support is in lowered position, these shields surround the upper end of the body 1, and are entirely out of the way of the burner.

Various modifications may be made in the embodiment of my invention hereinbefore described within the nature of the invention and the scope of the following claims.

I claim:

1. A blast lamp comprising a body constituting a fuel reservoir, a burner, connections between the body and the burner adapted to permit the burner to be swung into upright or horizontal position, a support mounted upon the fuel reservoir and adapted to be elevated above the burner when the burner is in vertical position, and depressed below the burner when the burner is to be turned to a horizontal position.

2. A blast lamp comprising a body constituting a fuel reservoir, a burner, a connection between the body and burner, constructed to permit the burner to be swung into vertical or horizontal position, means for supporting a body to be heated above the burner when the burner is in vertical position and means for supporting a body above the burner when the burner is in horizontal position.

3. A blast lamp comprising a body constituting a fuel reservoir, a burner, connections between the body and the burner adapted to permit the burner to be moved into vertical or horizontal position, a support comprising a supporting portion and telescoping members connecting the supporting portion and the fuel reservoir whereby said support may be placed above the burner when the burner is in vertical position or depressed below the burner when the burner is to be placed in horizontal position.

In witness whereof, I have hereunto set my hand this 27th day of October, 1908.

LOUIS SCHEMNITZ.

Witnesses:
 CLARENCE G. GALSTON,
 F. B. ROY.